(12) United States Patent
Uzelac

(10) Patent No.: US 6,611,918 B1
(45) Date of Patent: Aug. 26, 2003

(54) METHOD AND APPARATUS FOR CHANGING BIAS LEVELS TO REDUCE CMOS LEAKAGE OF A REAL TIME CLOCK WHEN SWITCHING TO A BATTERY MODE OF OPERATION

(75) Inventor: Lawrence S. Uzelac, Auburn, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/469,986

(22) Filed: Dec. 21, 1999

(51) Int. Cl.[7] .................................................. G06F 1/32
(52) U.S. Cl. ........................ 713/320; 713/300; 713/323
(58) Field of Search .................... 713/300, 323, 713/320; 327/544, 142, 534

(56) References Cited

U.S. PATENT DOCUMENTS

| | | |
|---|---|---|
| 5,838,171 A | 11/1998 | Davis |
| 5,909,140 A | 6/1999 | Choi |
| 5,917,365 A * | 6/1999 | Houston .................... 327/534 |
| 6,191,470 B1 * | 2/2001 | Forbes et al. ................ 257/347 |
| 6,307,233 B1 * | 10/2001 | Awaka et al. ................ 257/368 |
| 6,373,321 B1 * | 4/2002 | Yamauchi et al. ............. 326/33 |
| 6,380,798 B1 * | 4/2002 | Mizuno et al. .............. 327/534 |

FOREIGN PATENT DOCUMENTS

JP         10189884 A *   7/1998   ........... H01L/27/04

OTHER PUBLICATIONS

Muhammad M. Khellah and M.I.Emasry, Power Minimization of High–Performance Submicron CMOS Circuits Using a Dual–Vd Dual–Vth (DVDV) Approach, Proceedings 1999 international symposium on Low power electronics and design Aug. 1999, ACM, pp. 106–108.*

Roy, K.; "Leakage power reduction in low–voltage CMOS designs", Electronics, Circuits and Systems, 1998 IEEE International Conference on , vol.: 2 , 1998, pp. 167 –173 vol. 2.*

Anonymous, *Diode Battery Back–Up Switch*, IBM Technical Disclosure Bulletin, vol. 30, No. 2, Jul. 1, 1987 p. 895.

* cited by examiner

*Primary Examiner*—Jeffrey Gaffin
*Assistant Examiner*—James K. Trujillo
(74) *Attorney, Agent, or Firm*—Fish & Richardson P.C.

(57) ABSTRACT

A CMOS circuit for low leakage battery operation connects the real time clock to the power supply when available or to a low leakage source when the power supply is not available.

18 Claims, 2 Drawing Sheets

METHOD AND APPARATUS FOR CHANGING BIAS LEVELS TO REDUCE CMOS LEAKAGE OF A REAL TIME CLOCK WHEN SWITCHING TO A BATTERY MODE OF OPERATION

BACKGROUND

The present application teaches a circuit for use in reducing power consumption of a real time clock in a computer system.

When a personal computer is turned off, an on-board battery, e.g. a 3-volt lithium battery, may still power certain circuits in the computer. For example, a real time clock often still maintains the time using battery power when the primary computer power supply goes offline.

The smaller transistors that are now used to make such circuits in order to fit more transistors on a substrate, often have higher leakage currents. These transistors consume undesired current when they are biased to the "off" state. This increases the DC load that is placed on the battery, when the computer power supply is off due to off state current, which can cause the battery to deplete more quickly.

SUMMARY

The present disclosure defines a device which reduces power consumption during battery powered operation of the Real Time Clock.

The application discloses a leakage reduction device for a real time clock system, that has a real time clock circuit, having separated first and second power supply connections, and maintaining a count indicative of real time; and an associated circuit, which operates in a first mode when a power supply voltage is present and operates in a second mode when battery power is present, said second mode providing a biasing condition that minimizes off state leakage current during battery operation.

BRIEF DESCRIPTION OF THE DRAWINGS

These and other aspects will be described in detail with reference to the accompanying drawings, wherein.

DESCRIPTION OF EMBODIMENT

The present application describes reducing the undesired current flow through transistors in a clock circuit. In an embodiment, the transistors are MOS devices. The sub-threshold off current of these MOS devices is reduced by applying a voltage bias to the substrate relative to the gate, source and drain voltages. The relative device threshold voltage is then increased according to the relation $$\Delta V_t = \left[\frac{(2\varepsilon_0 \varepsilon_{ox} q N_a)^{1/2}}{C_{ox}}\right] \cdot \left[(2\phi_f - V_{bias})^{1/2} - (2\phi_f)^{1/2}\right]$$

The sub-threshold is also reduced according to the relation $$I_{off} = I_o \cdot e^{\frac{q}{KT}((v_o - (v_t + \Delta V_t))/n)} \left(1 - e^{\frac{q}{KT} v_{DS}}\right)$$

with $$I_o = \frac{\mu_v C_{ox} W_{eff}}{L_{eff}} \cdot \left(\frac{KT}{q}\right)^2 e^{1.8}$$

Figure 1:
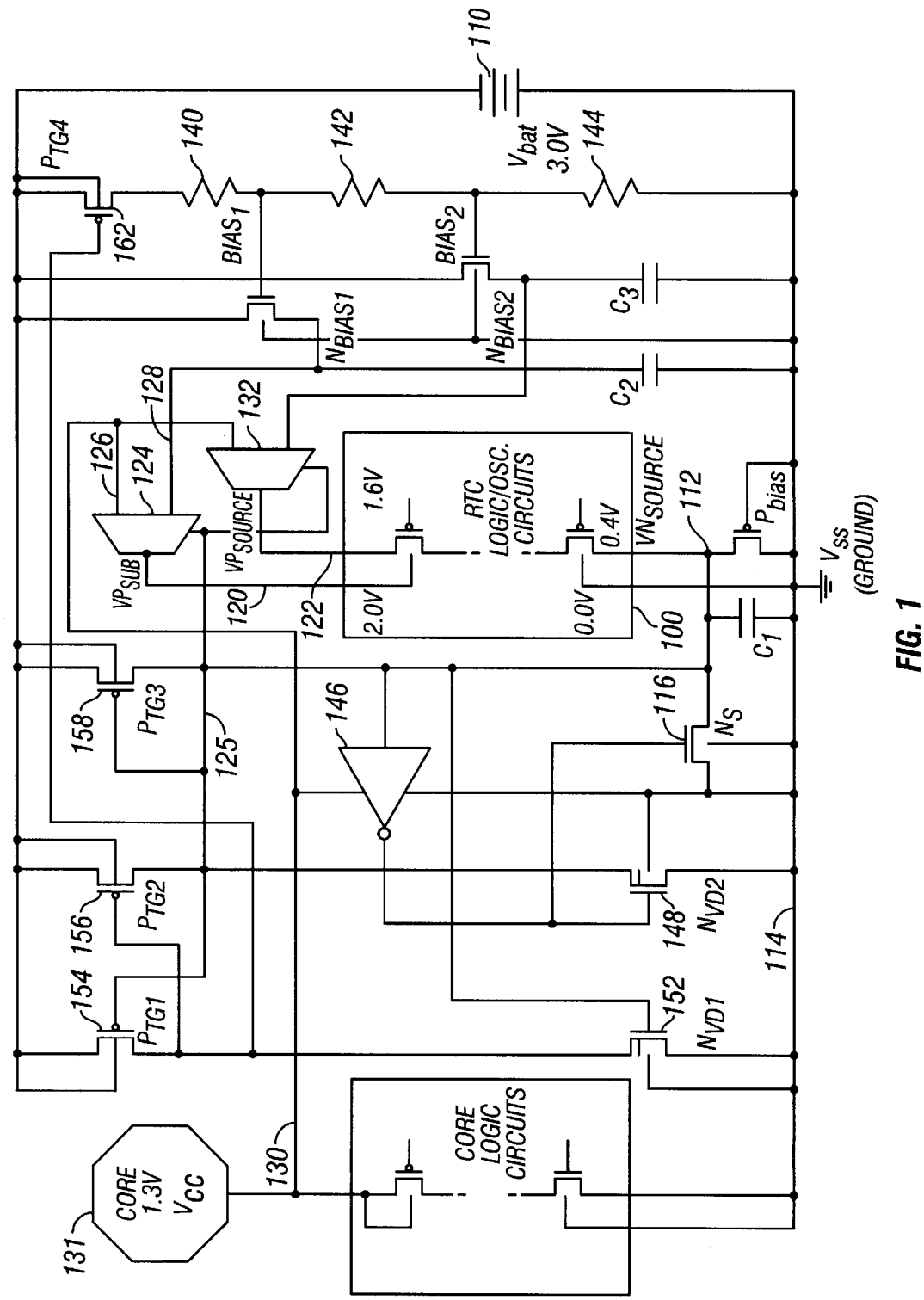
FIG. 1 shows a schematic diagram of the circuitry including the real time clock well.

A schematic diagram of a specific circuit, e.g., a computer chipset, is shown in FIG. 1. This circuit includes a real time clock circuit portion 100 that has separate power supply connections for the battery and for the wired power supply. The part that is always powered is separated from other circuits in the chip. The real time clock 100 is called the "RTC well" since it has the separate power supply connections. The separated connection enables battery 110, e.g., a 3.0 volt lithium battery, to be used to power the real time clock well while the remainder of the circuit is turned off.

An off-chip diode network has been used to isolate the battery from the computer's power supply once the computer is actually turned on.

The present application discloses circuitry forming a relative substrate bias which reduces the off current ($I_{off}$) of the real time clock circuit during battery operation. This is done by changing source voltage levels in the real time clock well when the main power supply is turned off.

Switching devices, described in more detail herein, are connected between the source and substrate connections of N-channel and P-channel real time clock devices in the well 100. This better isolates the substrate from the N-channel source connection and isolates the N well from the P-channel source connection during battery operation. These switches are in one state when primary chip power or "core power" is available. The switches are in another state when the primary chip power is off and the real time clock circuit 100 is powered by the battery 110. In this latter state, the bias voltage of the real time clock is raised to a level that decreases leakage. The real time clock logic continues to operate at the raised source voltage condition during the low-leakage battery operation.

The circuit and its control are illustrated in FIG. 1. The RTC well 100 has three power connection nodes. The $Vn_{source}$ power node 112 of the real time clock module 100 is controlled by N-channel switching transistor ($N_s$) 116. Energizing $N_S$ 116 selectively switches the $Vn_{source}$ node 112 to the $V_{ss}$ ground rail. When transistor 116 is de-energized, node 112 floats.

P-channel device well nodes of the real time clock include $Vp_{Sub}$ 120, and $Vp_{source}$ 122. Multiplexers 124 and 132 control the power supplied to these nodes. These multiplexers can be thick-gate P-channel MOS devices. The $Vp_{sub}$ node is controlled by multiplexer 124. One input 126 to the 20 multiplexer 124 is the core 1.3 volt power line 130 from power supply 131. The other input 128 to the 20 multiplexer 124 is a power consumption-reducing bias level $N_{bias1}$. This bias level is formed by the biasing resistors 140, 142, 144 placed across the battery 110.

Analogously, the multiplexer 132 receives the core power supply 1.3 volts 130 at its one input, and a second bias level $N_{bias2}$ at the other input thereof.

These bias levels are selected to minimize the leakage. $Vp_{sub}$ (120) can be 2.0 volts, and $Vp_{source}$ (122) can be 1.6 volts.

Level shifting logic, including $N_{VD1}$ (152), $N_{VD2}$ (148), $P_{TG1}$ (154), and $P_{TG2}$ (156) control the switching of the multiplexers 124 and 132. When core power 130 is present, inverter 146 is enabled and controls the gate voltages of the n-channel devices $N_s$ 116 and $N_{VD2}$ 148.

In normal operation, when the power supply 131 is on, an output voltage is produced on line 130. The inverter 146 is enabled, producing a high output that pulls up the gate voltage of the devices $N_s$ 116 and $N_{VD2}$ 148. Biasing $N_{VD2}$ 148 turns on $N_s$ 116 and connects the N-channel source node $Vn_{source}$ to ground 114.

Biasing of $N_{VD1}$ 152 causes $P_{TG1}$ and $P_{TG2}$ to raise the multiplex control line 125, switching the multiplexer units 124, 132. This connects the nodes $Vp_{sub}$ and $Vp_{source}$ to the core 1.3 volt power 130.

When core power 130 is not available, the real time clock 100 operates under battery power. The output of $P_{TG3}$ 158 pulls up the input to the inverter 146, thereby lowering the output of the inverter 146, and turning off the gate of $N_{VD2}$ 148 and $N_S$ 116. $N_S$ 116 isolates $Vn_{source}$ from ground 114. The multiplexer units 124, 132 are also caused to switch, thereby connecting the real time clock nodes $Vp_{sub}$ 120 and $Vp_{source}$ 122 to the bias voltages $N_{bias1}$ and $N_{bias2}$, respectively. This also causes device $P_{TG4}$ 162 to turn on, to establish the bias levels $b_{ias1}$ and $b_{ias2}$ across the resistor ladder, 140, 142, 144 using battery power. The bias resistors should be larger than 10 M ohms, to minimize current flow from the battery.

This circuit even further conserves battery power since the bias resistors are isolated from the battery during non-battery operation.

As noted above, these bias values are selected as values that will allow the RTC logic and oscillator circuits in the well 100 to operate at low leakage current levels. Selected bias levels include $Vn_{source}$ at 0.4 volts, $Vp_{sub}$ at 2.0 volts and $Vp_{source}$ at 1.6 volts.

The circuits in the real time clock well should continue to operate at all times. Capacitors C1, C2, C3 are used to decouple any switching noise during the transition between the two modes of operation to prevent the registers from being corrupted during a transition between the normal operation and the low leakage battery-powered operation. These capacitors have a value of, for example 10 pF. In summary, the on and off conditions of the circuits during the two modes of operation are listed below in Table 1.

TABLE 1

|  | 1.3 V Core Power ON: (normal operation) | 1.3 V Core Power OFF: (low leakage operation) |
| --- | --- | --- |
| $N_S$ | ON | OFF |
| $N_{VD1}$ | OFF | ON |
| $N_{VD2}$ | ON | OFF |
| $P_{TG1}$ | ON | OFF |
| $P_{TG2}$ | OFF | ON |
| $P_{TG3}$ | ON | OFF |
| $P_{TG4}$ | OFF | ON |
| $N_{bias1}$ | OFF | ON |
| $N_{bias2}$ | OFF | ON |
| $Vn_{source}$ | 0 V | 0.4 V |
| $Vn_{sub}$ | 0 V | 0 V |
| $Vp_{source}$ | 1.3 V | 1.6 V |
| $VP_{sub}$ | 1.3 V | 2.0 V |

Figure 2:
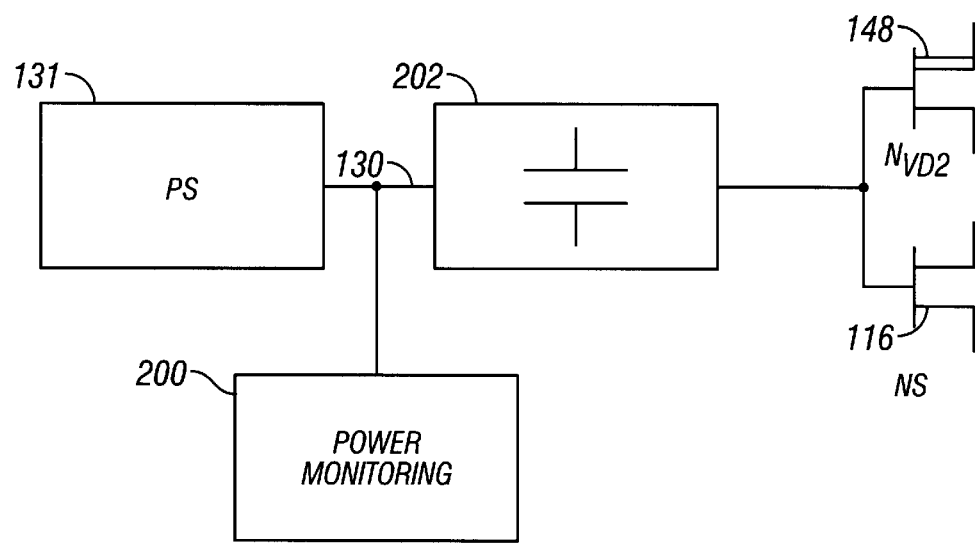
FIG. 2 shows a block diagram of a power monitoring embodiment.

A second embodiment is shown in block diagram form in FIG. 2. A hardware monitor device 200 monitors characteristics of the computer, including temperature, power supply level and other information. The device 200 produces a "power okay signal" when the power supply is up and running. This "power okay" signal is delayed by delay element 202 (e.g. a capacitor), and then drives the gates of $N_{VD2}$ and $N_s$ instead of the inverter 146 shown in the first embodiment.

Use of the power okay signal may help to isolate the real time clock well 100 from rail noise during a turn on sequence. For example, the hardware monitor could use a delay mechanism as shown, e.g., the power okay signal would only be produced after the power supply is stabilized. This keeps the real time well 100 isolated until the power supply is sufficiently stable.

Although not described in detail herein, other embodiments fall within the spirit and scope of the disclosed invention, as set forth is the appended claims.

What is claimed is:

1. A leakage prevention device for a real time clock system, comprising:

a real time clock circuit, having separated first and second power supply connections, and maintaining a count indicative of real time; and an associated circuit, which operates in a first mode when a power supply voltage is present and operates in a second mode when battery power is present, said second mode providing a biasing condition that minimizes leakage current during battery operation by changing source voltage levels for the real time clock circuit.

2. A device as in claim 1, further comprising a device which detects the presence of the power supply voltage, and switches said bias levels responsive thereto.

3. A device as in claim 2, wherein said biasing condition includes a raised bias level which increases a relative threshold voltage of at least one transistor in said real time clock circuit.

4. A device as in claim 1, further comprising a bias production part, driven by said battery.

5. A device as in claim 3, further comprising a power supply ready signal and a delay element that delays switching between said first mode and said second mode.

6. A device as in claim 4, further comprising a bias transistor, between said battery and said bias production part, and turned on only when power supply voltage is not present.

7. A device as in claim 1 further comprising first and second switches connected to said first and second power supply connections, switching between a first power supply level and a bias level optimized for minimization or battery leakage.

8. A device as in claim 1, further comprising a first switch, switching between a first power supply level and a bias level optimized for minimization of battery leakage.

9. A device as in claim 8, further comprising a second switch, connected between said second power supply connection and ground.

10. A device as in claim 1, further comprising at least one decoupling capacitor, having a sufficient size to prevent errors during power supply switching.

11. A method of operating a real time clock in a personal computer, comprising:

operating a real time clock from a power supply during a first mode of operation; and operating said real time clock from a battery during a second mode of operation, said operating comprising setting a bias level which minimizes leakage current during said operating by changing source voltage levels for said real time clock.

12. A method as in claim 11, further comprising automatically detecting a power supply voltage, and commanding a switch to change a power supply connection to the real time clock, based on presence of the power supply voltage.

13. A method as in claim 12, further comprising, only in a battery operated mode, use of bias resistors to form bias levels for said real time clock, wherein one position of said switch supplied said bias level.

14. A method as in claim 12, further comprising decoupling the power supply during switching.

15. A method as in claim 13, further comprising detecting a power supply voltage, waiting a predetermined time after said detecting of said power Supply voltage to ensure that said power supplies voltage is stabilized, then producing a power supply go signal.

16. A method as in claim 12, wherein said commanding is responsive to a power supply go signal.

17. A real time clock system, comprising:
   a real time clock circuit, having a first power supply connection;
   a controlling circuit for said real time clock circuit, said controlling circuit including a connection to a power supply and a connection to a battery and including a control circuit which connects said real time clock to said power supply connection when said power supply voltage is available, and connects said real time clock to a low leakage bias source to change source voltage levels for said real time clock circuit when said power supply is not available.

18. A real time clock system, comprising:
   a real time clock circuit, having a first power supply connection and a second power supply connection;
   a controlling circuit for said real time clock circuit, said controlling circuit connected between a power supply and said first power supply connection, and connected between a battery and said second power supply connection, and including a control circuit which detects if said power supply is available, connects said real time clock to said power supply connection when said power supply voltage is available, and if said power supply is not available, connects said battery to a bias network to produce a plurality of bias levels which reduce leakage currents by changing source voltage levels for said real time clock circuit, and connects said real time clock to said bias levels.

* * * * *

UNITED STATES PATENT AND TRADEMARK OFFICE
CERTIFICATE OF CORRECTION

PATENT NO. : 6,611,918 B1
DATED : August 26, 2003
INVENTOR(S) : Lawrence S. Uzelac and Andrew M. Volk It is certified that error appears in the above-identified patent and that said Letters Patent is hereby corrected as shown below:

<u>Title page,</u>
Item [75], Inventors, please add inventor -- Andrew M. Volk --.

Signed and Sealed this

Twenty-first Day of June, 2005

JON W. DUDAS
*Director of the United States Patent and Trademark Office*